(12) United States Patent
Weist et al.

(10) Patent No.: US 7,645,431 B2
(45) Date of Patent: Jan. 12, 2010

(54) PURIFICATION OF NOBLE GASES USING ONLINE REGENERATION OF GETTER BEDS

(75) Inventors: Annemarie Ott Weist, Macungie, PA (US); Shyam Ramchand Suchdeo, Macungie, PA (US); Jake Fotopoulos, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 133 days.

(21) Appl. No.: 11/877,258

(22) Filed: Oct. 23, 2007

(65) Prior Publication Data

US 2009/0104101 A1 Apr. 23, 2009

(51) Int. Cl.
*B01D 53/00* (2006.01)
(52) U.S. Cl. .................. 423/210; 423/219; 423/245.1; 423/247; 423/262; 423/DIG. 5
(58) Field of Classification Search .............. 423/210, 423/219, 245.1, 245.3, 247, 262, DIG. 5
See application file for complete search history.

(56) References Cited

U.S. PATENT DOCUMENTS

| 3,219,414 | A | 11/1965 | Ronald |
| 3,361,531 | A | * | 1/1968 | Erb et al. ................ 423/219 |
| 4,579,723 | A | 4/1986 | Weltmer et al. |
| 4,816,237 | A | 3/1989 | Tomomura et al. |
| 4,983,194 | A | 1/1991 | Hopkins et al. |
| 5,125,934 | A | 6/1992 | Krishnamurthy et al. |
| 5,220,797 | A | 6/1993 | Krishnamurthy et al. |
| 6,113,869 | A | 9/2000 | Jain et al. |
| 6,123,909 | A | 9/2000 | Yamamoto et al. |
| 6,531,105 | B1 | 3/2003 | Giacobbe et al. |
| 2003/0044338 | A1 | 3/2003 | Giacobbe et al. |
| 2004/0237789 | A1 | 12/2004 | Baksh et al. |
| 2005/0025678 | A1 | 2/2005 | Rao |

FOREIGN PATENT DOCUMENTS

JP 59152210 A 8/1984

* cited by examiner

*Primary Examiner*—Timothy C Vanoy
(74) *Attorney, Agent, or Firm*—Anne B. Kiernan; John M. Fernbacher (57) ABSTRACT

Processes for the recovery and purification of noble gas stream contaminated with small amounts of hydrogen and/or other getter combustibles. One process involves dividing the noble gas stream gas into a first and second noble gas streams. The first noble gas stream is sent to a second metal getter containing a bed comprised of a metal getter in an oxidized state wherein the hydrogen is combusted. Oxygen is added to the second noble gas stream and the stream is passed through a catalytic unit wherein the hydrogen is combusted and then through a first metal getter bed operating in parallel with a second bed wherein the metal getter is converted to its oxide form. When breakthrough is detected in either bed, the flows of the first and second noble gas streams are rerouted to the other beds, respectively.

20 Claims, 2 Drawing Sheets

PURIFICATION OF NOBLE GASES USING ONLINE REGENERATION OF GETTER BEDS

BACKGROUND OF THE INVENTION

Noble gases often are used in powder metal sprays and plasmas as well as processes requiring chemically inert gaseous blankets and purges. When used in these processes they often become contaminated with trace levels of contaminants or impurities such as hydrogen, oxygen, and carbon monoxide. The presence of these contaminants and impurities in the noble gases, in the absence of treatment, generally prevents them from being reused in the processes.

Noble gases are quite expensive and thus systems have been developed to recover the gases from the various processes and to remove the trace contaminates and impurities therefrom prior to being recycled for reuse. Argon is the primary noble gas employed in inerting processes, and because a large volume of argon is used leading to a corresponding high cost for its use, systems have been developed to remove the impurities from argon streams.

Representative patents and articles relevant to the diverse ways for effecting recovery and purification of noble gases, and particularly argon, from process streams include:

U.S. Pat. No. 4,816,237 discloses the recovery of an argon stream from a silicon furnace and the subsequent purification of the argon gas having hydrogen as one of the many contaminants.

U.S. Pat. No. 4,983,194 discloses a process for the recovery of argon from an air separation unit.

U.S. Pat. No. 6,113,869 discloses a process for purifying an argon gas stream containing water, CO, $CO_2$, hydrogen and other common impurities to such waste streams.

U.S. Pat. No. 6,123,909 discloses a process for purifying argon in a multi-step process using catalysts.

U.S. Pat. No. 6,531,105 discloses a process for treating a nitrogen stream recovered as a non-permeate from a membrane separation process.

US 2005/0025678 discloses a process for treating an argon stream as might be obtained from a high temperature furnace for producing silicon wafers.

BRIEF SUMMARY OF THE INVENTION

The invention relates to a process for the purification of a gas stream comprising a noble gas, which may be referred to as a noble gas stream or a noble gas containing gas stream. The noble gas stream comprises contaminants, such as, hydrogen and optionally other combustible or reducible contaminants. By purification is meant that this process can provide a noble gas stream in which the composition of the at least one getter combustible in the noble gas stream will be reduced to less than 30 ppm, or less than 15 ppm, or less than 1 ppm.

This invention provides a process for the purification of a noble gas containing gas comprising the steps of: (a) passing a first noble gas stream comprising an unacceptable amount of at least one getter combustible through a first metal getter bed comprising a metal getter oxide under conditions for converting the getter combustible to a combustion product (e.g. to $H_2O$ and $CO_2$) thereby generating a first effluent stream which is essentially free of said at least one getter combustible and wherein said metal getter is converted to a reduced state; (b) passing a second noble gas stream through a catalytic unit and effecting catalytic combustion of said at least one getter combustible thereby forming an oxidizing stream, said oxidizing stream is essentially free of getter combustible and comprises unreacted oxygen; (c) passing the oxidizing stream formed in step (b) through a second metal getter bed containing a metal getter in reduced state and under conditions for forming a metal getter oxide thereby generating a second effluent stream which is essentially free of oxygen and essentially free of getter combustible; and, (d) switching the flow of said first noble gas stream and said oxidizing stream whereby the oxidizing stream generated in step (b) flows to the first metal getter bed and said first noble gas stream flows to the second metal getter bed.

This invention further provides a process for the purification of a noble gas stream contaminated with unacceptable amounts of hydrogen and optional combustible contaminants which comprises: (a) introducing an oxygen containing stream to a metal getter bed containing a metal getter in reduced state to form a metal getter oxide; (b) introducing the noble gas stream to the metal getter bed employed in step (a) which forms a metal getter oxide and converts the hydrogen in said noble gas stream to water thereby generating an effluent stream essentially free of hydrogen and oxygen; (c) terminating the step of introducing the oxygen containing stream to the metal getter bed after forming said metal getter oxide in step (a) in order to maintain the generating of the effluent stream essentially free of hydrogen and oxygen in step (b); (d) continuing the introducing of said noble gas stream to said metal getter bed in step (b) for reducing the metal getter oxide; and, (e) repeating said steps (a) through (d) for effecting continuous recovery and purification of said noble gas stream.

This invention further provides a process for the purification of a noble gas stream having unacceptable amounts of at least one getter combustible which comprises: (a) effecting catalytic combustion of said getter combustible in a catalytic unit thereby forming an oxidizing stream essentially free of getter combustible and comprising unreacted oxygen; (b) passing the oxidizing stream formed in step (a) through a metal getter bed containing a metal getter in reduced state and under conditions for forming a metal getter oxide and generating an effluent stream which is essentially free of said oxygen and said getter combustible; (c) terminating catalytic combustion in said catalytic unit prior to substantial breakthrough of oxygen in said effluent stream from said metal getter bed in order to generate an effluent stream from said metal getter bed which is essentially free of getter combustible and oxygen; (d) introducing a noble gas stream containing unacceptable amounts of getter combustible to said metal getter bed; and, (e) recovering a noble gas product from said metal getter bed which has been generated by the process set forth in steps (a) through (d).

Another embodiment relating to the process for purification of a noble gas stream resides in the steps:

(a) passing a noble gas stream through a metal getter bed containing a metal getter oxide under conditions for converting the hydrogen to combustion byproducts and generating an effluent stream free of hydrogen;

(b) adding oxygen to a metal getter bed under conditions for maintaining the presence of said metal getter oxide; and, (c) terminating the step of introducing oxygen to the metal getter bed should there be an oxygen breakthrough presence in said effluent stream.

In another embodiment a catalytic unit is added to the above described first embodiment to allow for combustion of impurities not combusted by the metal getter oxide in the metal getter bed. When added upstream of the metal getter bed, the combustion unit enables for a more conventional operation of the metal getter bed allowing the metal getter bed to either be in reduction mode or oxidation mode and not both simultaneously.

In another embodiment the noble gas stream contaminated with hydrogen, and optionally other combustible or reducible impurities, is purified in apparatus comprised of a catalytic unit and a multiple metal getter bed system operating in alternate oxidation and reduction modes. In this embodiment the noble gas feed stream designated $F_{total}$ is divided into a first stream designated $F_r$ and a second noble gas stream designated $F_{total}-F_r$. The first noble gas stream designated $F_r$ is sent to a first metal getter bed containing a metal getter oxide operating in reduction mode wherein the metal getter oxide is reduced and the hydrogen and some of the reducing impurities are oxidized. Oxygen is added to the second noble gas stream or to a catalytic unit wherein the hydrogen and catalyzed combustible contaminates are combusted. The resulting oxidizing stream ($F_o$) from the catalytic unit contains excess oxygen and it is passed through a second metal getter bed which is operating in an oxidizing mode, i.e., the metal getter therein is converted from a reduced state to an oxidized state. When breakthrough of hydrogen or oxygen is detected in the effluent stream from either of the first or second metal getter bed, the stream flows are rerouted and switched such that $F_r$ flows to the second metal getter bed and the oxidizing stream containing excess oxygen ($F_o$) flows to the first metal getter bed.

Significant advantages can be achieved using the purification process of this invention as described and these may include one or more of the following:
  elimination of the need to take a metal getter bed offline for regeneration, thus allowing for continuous purification and production of a noble gas, such as argon, while saving energy by eliminating the need for cooldown and for heating up the offline bed;
  elimination of the need for additional utilities, such as nitrogen for purging or a carrier gas for the regeneration of the offline bed; and,
  elimination of the need for using the noble gas to purge the regeneration gas from the metal getter beds before going back online.

DETAILED DESCRIPTION OF THE INVENTION

To facilitate an understanding of the invention as it pertains to the purification of a noble gas stream, for example argon contaminated with hydrogen, for eventual reuse, reference is made to the drawings. It should be understood that although an argon gas stream is the gas stream to be purified in the example, the process can be applied to the purification of a stream of any type of gas, e.g. other noble gases such as, for example, helium.

For purposes of facilitating an understanding of the purification process described herein two types of reducible or contaminant impurities are defined. The first type of reducible contaminant or impurity is defined as a "getter combustible". A getter combustible refers to a reducible impurity of the type that is combusted, i.e., converted to its oxide form, by a metal getter oxide. Hydrogen and carbon monoxide are the prime examples of getter combustibles found in contaminated noble gas streams. The second type of reducible impurity is termed "catalyzed combustible". Catalyzed combustibles are defined as reducible impurities, which in the presence of oxygen and a catalyst are converted to combustion byproducts. Catalyzed combustibles by definition include all getter combustibles, such as hydrogen and CO, as well as some hydrocarbons, e.g., methane, ethane, ethylene, and combustible organics. The difference by definition then between a "getter combustible" and a "catalyzed combustible" is that all getter combustibles are oxidized by a metal getter oxide whereas many of the catalyzed combustibles, such as methane, light hydrocarbons and organics, are not oxidized by such metal getter oxide at the operating temperature. The terms contaminant and impurity may be used interchangeably herein and mean the same thing.

The term "purification" when used to describe the process of this invention means a process for removing at least some of at least one contaminant present in a feed gas stream fed into the process to produce a product gas stream that has less of that contaminant present in the product gas stream. The term "purified" when used to describe the product gas stream from the purification process means that the product gas stream has less of at least one contaminant than the feed stream fed into the process from which the at least one contaminant was removed by the process. The terms "contaminants" and "impurities" will be used interchangeably.

The term "acceptable amounts" is used to describe the amounts of impurities that can be tolerated in the "purified" noble gas stream from the process of this invention. The acceptable amounts of impurities will depend upon the downstream use of the purified noble gas stream. In some applications, only 1 or 2 parts per million (ppm) or less of one or more types of contaminants, for example oxygen or hydrogen, can be tolerated (e.g. some electronics applications), whereas for other applications 10 parts per million (ppm) or less, or 15 ppm or less can be tolerated (e.g. hot isostatic pressing (HIPing) for metals processing operations), and for other applications less than 20 ppm, or less than 30 ppm, or less than 50 ppm, or less than 100 ppm one or more of the types of contaminants in the purified or product noble gas stream can be tolerated.

The term "essentially free" may be used to describe the amounts of contaminants in the product or purified noble gas stream produced by the process of this invention. Essentially free is related to the term acceptable amounts defined above. For some applications essentially free means only 1 or 2 parts per million (ppm) or less of at least one or more or all types of contaminants, or 10 parts per million (ppm) or less, or 15 ppm or less, or 20 ppm or less, or 30 ppm or less, or 50 ppm or less, or 100 ppm or less of at least one or more or all of the types of contaminants present in the purified or product noble gas stream. The terms contaminants and impurities will be used whether one or more than one type of contaminants or impurities are being measured.

The actual "breakthrough time" is the time, after switching the flow of the noble gas stream to be purified from a first metal getter bed to the second metal getter bed or after the oxygen flow to the catalytic unit is terminated when using a single getter bed, that it takes for the oxygen or the hydrogen (or other impurities) in the noble gas stream exiting the (second) metal getter bed to be detected by the analyzer in that noble gas stream exiting that metal getter bed. The amount of breakthrough, that is, the amount of impurities in the product or effluent stream exiting at least one the metal getter beds, that the purification process may allow in the product purified gas stream is a function of how much breakthrough can be tolerated by the downstream uses of the product purified noble gas stream and how much product purified noble gas stream is mixed together before use downstream. For example, if the product purified noble gas stream is collected and held in a tank, and most of the product purified noble gas stream contains less than 1 ppm of the contaminants, but the product purified noble gas stream at breakthrough contains 30 ppm of the contaminants for a fraction of the product collection time, that is, for just the breakthrough time, then the overall product noble gas stream when collected and mixed may contain less than 5 ppm of the contaminants. The acceptable amount of the contaminants in the product purified noble gas stream in the downstream reuse may be 10 ppm, which is satisfied after the product noble gas stream is collected, mixed, although the contaminants in the product noble gas stream for the breakthrough time exceeded the acceptable amount.

The term "substantial breakthrough" is used to mean an amount of breakthrough that if unchecked will result in the presence of one or more contaminants in the product purified gas stream that is above the acceptable amount for one or more types of the contaminants.

The term "noble gas" or "noble gas stream" is a gas stream that comprises mostly the noble gas and one or more contaminants. It may be referred to as a "gas stream comprising a noble gas" or a "noble gas containing gas stream" or the like.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity.

A. Catalytic Unit and One Metal Getter Bed

Figure 1:
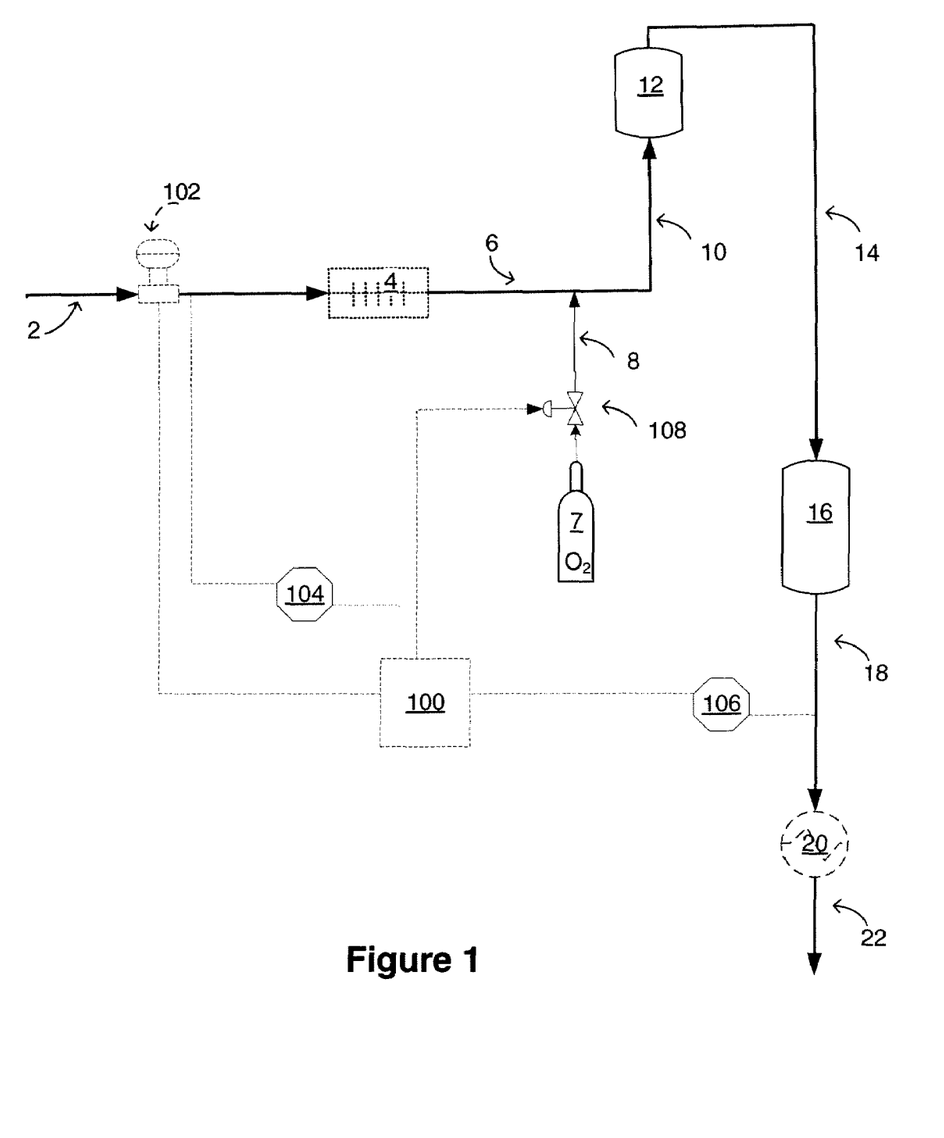
FIG. 1 is a flow diagram for the single metal getter bed purification of a noble gas from a process stream which contains a getter combustible.

Referring to FIG. 1, a control system (not labeled) which comprises a control unit 100, which may be a programmable logic controller (PLC), computer or the like, a flow meter 102, analyzers 104 and 106 for determining getter combustible and catalyzed combustible content, and control valve 108 for oxygen-containing gas supply 7. The control system is established to facilitate essentially automatic control of the purification process. The control unit 100 has the ability to receive information from the flow meter 102 and analyzers 104 and 106, and based on the programming in the control unit 100 to communicate with and cause the adjustment of the control valve 108. Communication between the analyzers, valves, etc. occurs electrically or via radio frequencies or the like. In the purification process a noble gas stream, for example an argon stream, comprising and contaminated with a getter combustible, generally hydrogen, and/or CO and optionally a catalyzed combustible, including dopants, and oxygen, as might be present in the effluent from a high temperature metal or silicon furnace, is captured from such furnaces or other upstream process and delivered to the purification process of this invention via line 2. In some embodiments, the concentration of hydrogen, as a getter combustible, typically ranges from 200 to 700 ppm in the noble gas stream 2, but generally it may range from 50 to 1000 ppm, while the level of other getter combustibles, e.g., CO and catalyzed combustibles such as methane and other light organics may range from 0 and 1000 ppm in the noble gas stream. Before the contaminated argon or other noble gas stream can be reused in most applications, the getter impurities, as well as oxygen, should be removed so that their total impurity level is below 30 ppm, preferably below 5 ppm and sometimes lower as described earlier. This purification process may be used to provide a noble gas stream having an oxygen or hydrogen level less than 30 ppm, preferably less than 5 ppm. It is preferred in the process that all impurities to be removed by the process are removed to (or below) preselected levels.

Noble gas stream e.g. argon stream 2 passes through flow meter 102 and the composition is analyzed by analyzer(s) 104 for getter combustibles and catalyzed combustibles (typically the analysis is limited to determining the amounts of $H_2$, CO, total hydrocarbon compounds (THC) and oxygen in the stream). Knowing the flow rate and composition, one can estimate or a control unit can determine the operating sequence between oxidation and reduction of the metal getter. Subsequent to analysis, the argon stream is passed through preheater 4 where the temperature of the argon stream is raised to operating temperature which is typically from 200° to 500° F., or to 450° F. From preheater 4, it is conveyed via line 6 wherein it is mixed with a stoichiometric excess of oxygen, based upon the amount of getter combustibles and catalyzed combustibles measured by analyzer 104. The amount of oxygen introduced, for example, delivered or injected, into the contaminated noble gas stream in line 6 from tank 7 via line 8 is controlled by valve 108 which is operated by signals from control unit 100. This mixture of argon and oxygen then is passed via line 10 to catalytic unit 12. In variations of the above method that are not shown, oxygen can be injected directly into catalytic unit 12 instead of into line 6 or into both the catalytic unit 12 and into line 6 and/or oxygen can be injected into line 2 after the flow meter 102 and prior to the preheater 4.

The oxygen delivered to the process via tank 7 is preferably a high-purity oxygen containing gas, having a purity of greater than 99%. However, a lower purity oxygen containing gas can be used if the "impurity" in the oxygen containing gas is argon and the stream to be purified is argon. Alternatively, other impurities may be tolerated in the oxygen: if downstream of the process of this invention are additional purification steps in which the impurity in the oxygen containing gas will be easily removed; if the process of this invention can tolerate the impurities; or if the downstream use of the purified stream can tolerate the impurities present in the oxygen stream that may end up in the resulting purified noble gas stream, for example, nitrogen present in the oxygen supply.

Catalytic unit 12 contains a metal catalyst capable of converting catalyzed combustibles to their oxide form. Platinum or palladium or a mixture of both, carried on an alumina support may be employed as a catalyst. In catalytic unit 12 catalyzed combustibles, in the presence of oxygen, and under catalytic conditions, are converted to water and carbon dioxide. Generally catalytic unit 12 is operated at temperatures from about 200 to 250° C.

The effluent stream in line 14 from catalytic unit 12 is free or essentially free of catalyzed combustibles including getter combustibles, such as hydrogen, CO, and hydrocarbons. However, the effluent stream in line 14 from catalytic unit 12 contains unreacted oxygen and it is necessary to remove the oxygen from the effluent stream. Oxygen removal is effected by contacting the oxidizing stream with a metal getter which is in its reduced state. More specifically, the oxidizing stream from catalytic unit 12 is conveyed via line 14 to metal getter bed 16, which contains a metal getter. As the effluent stream passes through metal getter bed 16, the metal getter is converted to its oxide form while the process stream is depleted of its excess oxygen.

A metal getter facilitates the purification process in that in its metal oxide form it is capable of liberating oxygen to getter combustibles such as hydrogen to form water and CO to form carbon dioxide, and in its reduced state it removes oxygen from a stream, for example, from the oxidizing effluent stream exiting from catalytic unit 12. An example of a metal getter is a copper getter material such as BASF R3-11, which is comprised of 30% copper on an alumina support. It is a useful metal getter for the treatment of the argon stream. Other examples of metal getters include the metal oxides, MnO and NiO.

When the metal getter becomes fully oxidized, there will be an oxygen breakthrough in line 18 unless flow is discontinued. At that point, and preferably slightly before substantial oxygen breakthrough or before the amount of oxygen is above the acceptable amount for the noble gas stream exiting the process of the invention (also referred to as the product purified noble gas stream or the purified noble gas stream or the like), oxygen flow in line 8 to catalytic unit 12 is terminated and therefore combustion of catalyzed combustibles in catalytic unit 12 is terminated. With the termination of the combustion of catalyzed combustibles in catalytic unit 12, removal of getter combustibles shifts from the catalytic unit 12 to metal getter bed 16. As the oxygen is liberated from the metal getter oxide and the metal getter becomes fully reduced there will be an eventual breakthrough of getter combustibles from metal getter bed 16, if the flow of the oxygen prior to or into the catalytic unit 12 is not restarted.

In the FIG. 1 embodiment, it is the combination of a catalytic unit with a metal getter in the metal getter bed that allows for continuous purification of a noble gas stream using a simple control system.

To prevent product contamination caused by substantial getter combustible or oxygen breakthrough the product gas stream in line 18 from metal getter bed 16 is analyzed by analyzer 106 for getter combustibles, typically hydrogen and oxygen. Depending on the final argon purity requirements, the analysis sample can either come from the metal getter bed effluent as shown in line 18 or it can be at any point in the metal getter bed 16. If the sample point for analyzer 106 is within the metal getter bed (not shown), optionally near the metal getter bed exit, which for example may be at a location (not shown) that is $\frac{1}{4}^{th}$ of the metal getter bed length from the exit, then there may be sufficient bed length available to oxidize most, if not all, of the getter combustibles that are within the metal getter bed and line 14 before breakthrough from the bed after detection of the contaminant (at too high of an amount) by that analyzer. If there is a breakthrough, i.e., the presence of an unsatisfactory level of at least one impurity in stream 18 as detected by analyzer 106, or if breakthrough is imminent (when analyzers receiving gas samples from within the bed detect one of more of the impurities at an amount above what the process allows for), control unit 100 adjusts the flow of oxygen through valve 108 to commence or terminate the conversion of catalyzable combustibles to their oxide form (via the added oxygen) in the catalytic unit 12 and to commence or terminate the oxidation or reduction of the metal getter bed 16 as the case may be. When an oxygen-containing gas is introduced into the catalytic unit (or to the noble gas stream entering the catalytic unit), oxygen will eventually breakthrough the metal getter bed 16 if no further adjustments are made to the process by the control system, that is, if the flow of oxygen is not terminated. When the oxygen-containing gas is not introduced into the catalytic unit (or to the noble gas stream entering the catalytic unit), hydrogen will eventually breakthrough the metal getter bed 16 if no further adjustments are made to the process by the control system, that is, the flow of oxygen is not turned on.

In the embodiment shown in FIG. 1, a purified or cleaner product argon-containing stream is cooled in heat exchanger 20 and delivered via line 22 for further purification steps (not shown) or reuse.

An advantage of employing the combination of a catalytic unit and metal getter in the purification of a noble gas stream, such as argon, is that it allows for removal of the reducible impurity, hydrogen and carbon monoxide, and, in some cases, a large percentage of catalyzed combustibles such as hydrocarbons. Even though not all hydrocarbons are converted to carbon dioxide, the level of hydrocarbon and organic impurity reduction by the use of the combination of apparatus may be sufficient for argon recycle. In addition to hydrogen and carbon monoxide reduction, the product noble gas stream, e.g., argon, is essentially free of oxygen. The $CO_2$, $H_2O$, and most of the remaining hydrocarbons (HC) can be removed in subsequent adsorption systems if desired.

B. One Metal Getter Bed

In another embodiment of the invention, it is possible to employ a simpler variation of the process described in FIG. 1 by omitting or deactivating catalytic unit 12. However, the final product stream will contain more of the reducible impurities, e.g., hydrocarbons not oxidized by the metal getter in metal getter bed 16. When the catalytic unit 12 is removed from operation, one alternately switches the oxygen flow to an on position when the metal getter is in its reduced state and to an off position when the metal getter is in an oxidized state. In the initial part of the metal getter bed 16, then, the metal getter may be undergoing sequential reduction and oxidation with excess oxygen passing through the metal getter bed and oxidizing the balance of the metal getter in the metal getter bed to its oxide form. Oxygen flow to the metal getter bed is terminated preferably just prior to oxygen breakthrough in the metal getter bed. This alternative process for purifying the noble gas stream, although offering simplicity in terms of equipment requirements, is more difficult to operate because of the apparent simultaneous reduction and oxidation of the metal getter.

C. Catalytic Unit and Two Metal Getter Beds

Figure 2:
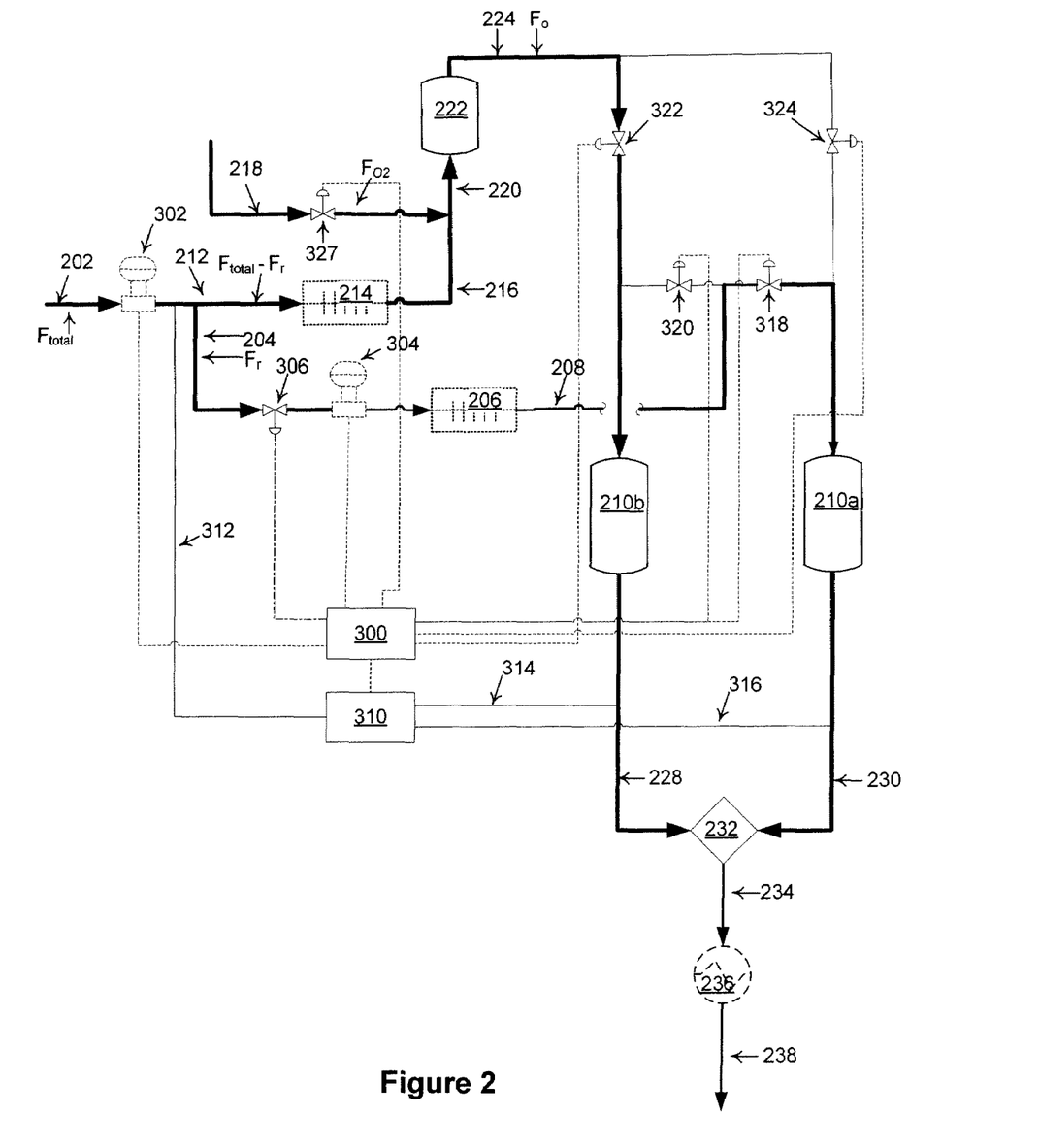
FIG. 2 is a flow diagram for the purification of argon from a process stream which contains a getter combustible using metal getter beds operating in parallel.

In an alternate embodiment of the purification process, and as described in FIG. 2, the argon stream is processed in a purification system comprised of at least one catalytic unit and a plurality of metal getter beds operating in parallel. By parallel operation of the metal getter beds, it is meant that at a given point in time more than one bed are online and processing flow in a nonsequential manner. By operating in the manner to be described, it is possible to operate with continuous production in more than one metal getter beds without taking any bed off line for regeneration.

To facilitate an understanding of this embodiment, reference is made to FIG. 2 comprising one catalytic unit and two metal getter beds.

Similar to the embodiment shown in the FIG. 1, the control system (not labeled) is comprised of at least one control unit 300, at least one flow meter, as shown, flow meters 302, 304, at least one control valve, as shown, control valves 306, 318, 320, 322, 324 and 327, and optional sample lines 312, 314 and 316 and at least one analyzer 310, which may be one or more analyzers as shown in FIG. 1. In other embodiments of this invention, the control system comprises at least one control unit, at least one flow meter, and at least one analyzer and optionally at least one control valve to provide a control system that automatically can respond to changes in at least some of the variables in the process, such as changes in flow rate, changes in noble gas stream composition, breakthrough or other process variables. In other embodiments the control system comprises at least one control unit and at least one or more of the following: flow meters and/or analyzers and/or valves in any combination as long as the control system can detect and respond to changes in the process variables.

A feed argon containing stream designated $F_{total}$ contaminated with a getter combustible such as hydrogen, and generally with catalyzed combustibles, is introduced to the purification process via line 202 wherein it is passed through flow meter 302 and the composition analyzed via sample line 312 by analyzer 310. In one embodiment, the flow rate $F_{total}$ (determined by flow meter 302) and compositional analysis of the argon stream are communicated to control unit 300 and using that information the control unit 300 may determine the portion ($F_{total}-F_r$) of the argon containing gas stream to direct to the catalyst unit and the portion $F_r$ of the argon containing gas stream to direct to one of the getter beds. Control valve 306 may be automatically adjusted via communication from the control unit 300 to valve 306 to provide for those portions. Additionally or alternatively, the oxygen requirement and an approximation of the cycle times for the metal getter beds can be calculated by the control unit 300 and that information can be used to control the process by the control unit's control of control valves 327, 320, 322, 318, 306 and 324.

Stream 202 is divided into two streams forming stream 204 and 212, although alternatively, the feed stream (the contaminated argon containing gas stream) may be introduced to the process through two or more feed lines depending upon design preference. The flow rate of stream 204 which is referred to herein as stream $F_r$ is measured by flow meter 304 and the rate controlled by valve 306 via control unit 300. Stream 204 is heated in preheater 206 to the operating temperature and sent via line 208 to either metal getter bed 210a or 210b. The flow direction of $F_r$ to one of the metal getter beds is controlled by opening and closing, or closing and opening valves 318 or 320, respectively.

Stream 212, having a flow rate designated $F_{total}-F_r$, is heated in preheater 214 and $O_2$ is added from an oxygen source (not shown) to line 216 via line 218. The desired flow rate of oxygen ($Fo_2$) introduced into line 216 via line 218 is that amount necessary for effecting combustion of catalyzed combustibles and for converting the metal getters to their oxide form during online regeneration. That amount is determined by the relation set forth in Equation 1:

$$Fo_2=(F_{total}-F_r)(\tfrac{1}{2}X_{H2}+\tfrac{1}{2}X_{CO}+n\,X_{THC})+F_r(\tfrac{1}{2}X_{H2}+\tfrac{1}{2}X_{CO}+n'X_{OGC})-F_{total}*X_{O2}$$ Equation 1:

wherein * indicates multiplied by, $Fo_2$ refers to the molar flow rate of $O_2$ delivered via line 218 to line 216, $X_{H2}$ refers to the molar concentration of $H_2$ in the streams $F_{total}-F_r$ and $F_r$, $X_{CO}$ refers to the molar concentration of CO in streams $F_{total}-F_r$ and $F_r$, and $X_{THC}$ refers to the molar concentration of hydrocarbons in stream $F_{total}-F_r$, and $X_{OGC}$ refers to the molar concentration of getter combustibles other than $H_2$ and CO in stream $F_r$. The multipliers n and n' are chosen to provide a balanced combustion equation for the total hydrocarbons and other getter combustibles, respectively. Note that the total amount of oxygen delivered is in stoichiometric excess (relative to the combustibles in $F_{total}-F_r$) by ($\tfrac{1}{2}X_{H2}+\tfrac{1}{2}X_{CO}+n'X_{OGC}-X_{O2})*F_r$ where $X_{O2}$ refers to the molar concentration of $O_2$ already present in the feed stream $F_r$. $F_{total}$, $F_r$, and ($F_{total}-F_r$) are the flow rates of the gas streams in lines 202, 204 and 212, respectively.

Basically, per Equation 1, oxygen is added (via an oxygen-containing gas) to the process in an amount to provide about the stoichiometric amount necessary to oxidize all of the getter combustibles in stream $F_{total}$ and to combust the catalyzed combustibles delivered to the catalytic unit 222. The embodiment of the invention provides for the addition of a substantially stoichiometric amount of $O_2$ as determined by Equation 1, or the addition of plus or minus 15% of, or plus or minus 10% or less of the stoichiometric amount of $O_2$.

The control valve 327 provided on the oxygen line 218 is part of the control system and is controlled by communication from the control unit to that control valve 327 after the control unit 300 calculates Equation 1 (or parts of Equation 1) using inputs from the flow meters and analyzers.

The preheated argon stream with the added oxygen is passed via line 220 to catalytic unit 222 wherein the catalyzed combustibles are converted to their oxide form. As in the FIG. 1 embodiment, to effect conversion of catalyzed combustibles such as $H_2$, CO and the hydrocarbons, it is common to employ a metal catalyst, e.g., Pd or Pd on alumina in catalytic unit 222. If one operates the process in accordance with the relationship of Equation 1, the oxidizing stream $F_o$ in line 224 exiting catalytic unit 222 will contain oxygen in substantially stoichiometric amount to the getter combustibles in stream $F_r$.

Oxidizing stream 224 now comprising unreacted oxygen is sent to the metal getter bed that is in its reduced state. The flow direction is controlled by the opening or closing of valves 322 or 324. As shown in FIG. 2, valve 322 is open and valve 324 is closed. In the selected bed the unreacted oxygen in oxidizing stream 224 oxidizes the metal getter contained in metal getter bed as the stream passes therethrough. Assuming in the initial cycle second metal getter bed 210b is in its reduced form, valve 324 is closed and valve 322 is opened allowing the flow to bed 210b (as shown) where the metal getter is oxidized by the unreacted oxygen in $F_o$.

Line 204 containing flow $F_r$, as earlier described, is preheated in preheater 206. The preheat temperature is generally less than 250° C., or to a temperature in the range from 150 to 200° C. The preheated stream is sent to a first metal getter bed 210a that is in its metal oxide form. Flow is directed by using valves 318 and 320. Assuming in the first initial cycle metal getter bed 210a is in its oxide form, any getter combustible, such as $H_2$, is oxidized in the presence of the metal getter oxide to form $H_2O$ and any CO in the stream is oxidized to $CO_2$. During this step the metal oxide in the metal getter bed is reduced to metal.

Streams 228 and 230 exiting metal getter beds 210b and 210a respectively are free or essentially free of getter combustibles hydrogen, carbon monoxide and oxygen meaning that the process provides a "purified" argon gas containing stream with an acceptable level of those impurities therein. Catalyzed combustibles in an amount $F_rX_{CC}$, where $X_{CC}$ is the molar concentration of catalyzed combustibles, will be present in stream 230 because, as stated, they are not converted by the metal getters to the respective oxides. Stream 228 and stream 230 are mixed together in mixer 232 and delivered via line 234 to aftercooler 236 where the gas is typically cooled to about 40° C. From aftercooler 236 the cooled stream if desired may be delivered via line 238 to an additional optional downstream purification step and system (not shown) such as an adsorption system where the oxidation products such as $H_2O$, $CO_2$, and remaining THC may be removed. The adsorption system can also be designed to remove other impurities such as nitrogen from the argon stream.

The downstream purification adsorption system, if desired, may be a pressure swing adsorption system (PSA), a temperature swing adsorption system (TSA), a thermally enhanced PSA or a vacuum swing adsorption system (VSA). The adsorption system may have two or more adsorption beds and the beds may have one or more layers of adsorbents to remove the variety of impurities remaining.

Eventually, in a given cycle of the purification process described in FIG. 2, the metal getter in the metal getter bed receiving the oxidizing stream from catalytic vessel 222, will become oxidized and the metal getter bed receiving $F_r$ flow will be reduced. At this point streams 208 and 224 to beds 210a and 210b, are switched or rerouted. Stream $F_r$ will flow via the closing of valve 318 and the opening of valve 320 to metal getter bed 210b. Correspondingly, valve 322 will be closed and valve 324 will be opened. The oxidizing stream $F_o$ in line 224, will now flow directly to metal getter bed 210a and oxidize the metal getter in metal getter bed 210a. By operating in this mode, online regeneration of a metal getter bed without removing either metal getter bed 210a or 210b from service can be accomplished while achieving continuous production of argon product, that is a purified argon gas stream or streams.

In order to maintain product purity, the control unit 300 should cause the rerouting of streams $F_r$ and $F_o$ to the other metal getter bed before breakthrough or substantial breakthrough of either getter combustible or oxygen from metal getter bed 210a or 210b. The breakthrough can be detected by analyzer(s) 310 from sample lines 314 and 316 located in the effluent lines 228 and 230 or, if desired, although not shown, from sample points located within the metal getter beds 210b and 210a as described in conjunction with FIG. 1. For example, if the sample points (not shown) are placed about ¾ of the total length of the bed from the entrance of metal getter beds 210a and 210b in the direction of the flow through the beds, then when breakthrough of oxygen or getter combustible is detected by one or both analyzers and the control unit causes the appropriate valves to open and close to direct $F_r$ and $F_o$ to the opposite beds, there will be sufficient inventory of metal getter in the remaining ¼ of the length of the metal getter beds to treat the remaining getter combustible or oxygen in the gas stream flowing through the bed and downstream of the changed valves (either valves 318 and 322 or valves 320 and 324) to prevent unacceptable levels of contaminants from reaching the product noble gas streams in lines 228 and 230. The optimal sampling position in the getter bed can be determined based on the lower detection limit of the analyzers and the target final purity of the product noble gas stream.

D. Control of Online Regeneration of Beds

In an ideal system, in which two metal getter beds are used that have the same volumes, lengths, diameters and performance characteristics of the metal getter therein, and the flow of oxygen added to the system, $F_{O2}$, exactly equals the stoichiometric amount needed to combust the getter combustibles and a certain fraction of the catalytic combustibles, then the oxygen will break through the bed receiving $F_o$ at the same time that hydrogen breaks through the bed receiving $F_r$. In this ideal system there is a total bed length of oxidized metal between the two getter beds at any given time. In the beginning of the cycle, the total length is the length of the bed about to receive the $F_r$ flow. As the feed step progresses, the oxidized length of the bed receiving $F_r$ decreases at the same rate that the oxidized length of the bed receiving $F_o$ increases, keeping a constant inventory of metal bound oxygen within the two beds.

In operation, however, the feed stream is analyzed for components on a discrete time basis. The discrete sampling, incorrect calibrations, valve failures and other upsets can result in too little or too much oxygen injected into the system. The symptom of an unbalanced oxygen metering is a difference in bed breakthrough times. In a first example, more oxygen is metered into the system than Equation 1 dictates, causing the bed receiving $F_o$ flow to breakthrough oxygen before the bed receiving $F_r$ is fully reduced. As a result, the total length of bound oxygen in inventory within the two beds equals more than one bed length. Finally, at breakthrough, the total length of oxidized section in the system will equal the total length of the bed receiving $F_o$ and the portion of the length of the bed receiving $F_r$ that was not yet reduced at breakthrough (of $O_2$ in the other bed), which will generally not be known (this length may be estimated if gas samples at intermediate distances within the bed are taken and analyzed). In order to reduce the total oxidized bed length in the system to the desired level of one bed length, a reduction in the oxygen flow $F_{O2}$ must be made.

In one control method, the flow $F_{O2}$ would be adjusted by the ratio of the breakthrough time for the bed receiving $F_o$ to that of the bed receiving $F_r$. The adjusted $F_{O2}$ flow is given in Equation 2;

$$F_{O2(n+1)} = F_{O2(n)} * t_{Fo(n)}/t_{Fr(n)} \qquad \text{Equation 2:}$$

Here $F_{O2(n+1)}$ is the oxygen flow for cycle n+1 and $F_{O2(n)}$ is the oxygen flow for cycle n, (cycle just previous to n+1), $t_{FO}$ is the breakthrough time of the bed receiving the oxidizing flow $F_O$, and $t_{FR}$ is the breakthrough time of the bed receiving the reducing flow $F_r$, both for cycle n. In practice however, the breakthrough time of only the first bed to breakthrough may be known because the beds are generally switched when the first bed breaks through. The practical option for adjusting oxygen flow is to use breakthrough times for intermediate distances in the beds by monitoring the composition of the gas stream at those positions in the bed. If breakthrough times at intermediate distances are used, the same distance from the top (or bottom) of the bed must be used for both beds unless the control unit programming is written to take into account the varying locations of the monitoring equipment. Further, the beds are preferably the same size having the same metal getter materials, etc, but it is possible to use different metal getter beds in the process of this invention and write the programming of the control unit to adjust the routing of streams between the getter beds and other pieces of equipment taking into account those differences. Also, the first sample points from the bottom of the beds that show oxygen breakthrough in the bed receiving $F_o$ and hydrogen breakthrough in the bed receiving $F_r$ should be used.

In this first example where the bed receiving $F_o$ breaks through first, the ratio of breakthrough times, $t_{Fo(n)}/t_{Fr(n)}$ is less than unity and $F_{O2}$ is reduced. In a second example, where the bed receiving $F_r$ breaks through with hydrogen before the bed receiving $F_o$ breaks through with oxygen, the ratio of breakthrough times is greater than unity resulting in an increase in $F_{O2}$ for the next cycle.

Another control method would be to reduce $F_{O2}$ by the ratio of actual breakthrough time to the theoretical breakthrough time calculated from flow and analytical measurements. The actual breakthrough time is the time, after switching the flow between the metal getter beds (or after the oxygen flow to the catalytic unit is terminated for single bed embodiments), that it takes for the oxygen or the hydrogen (or other impurities) in the noble gas stream exiting the metal getter bed to be detected by the analyzer in that noble gas stream.

The theoretical breakthrough time, which is the same for the bed receiving $F_o$ and the flow receiving $F_r$ is given by Equation 3;

$$t_{theo(n)} = C_c \bigg/ \left( \frac{1}{2t_{bt(n)}} \sum_{t_i=0}^{t_i=t_{bt(n)}} (x_{H2i} + x_{COi})(t_i - t_{i-1})F_{ri} \right) \quad \text{Equation 3}$$

The variables used in Equation 3 are given in Table 1. If the bed receiving $F_O$ breaks through first then the oxygen flow should be decreased by the ratio:

$$F_{O2(n+1)} = t_{bt(n)}/t_{theo(n)} * F_{O2(n)} \quad \text{Equation 4a:}$$

If the bed receiving $F_r$ breaks through first then the oxygen flow ratio should be increased by:

$$F_{O2(n+1)} = t_{theo(n)}/t_{bt(n)} * F_{O2(n)} \quad \text{Equation 4b:}$$

TABLE 1

| | Description | Typical Measure units | Equation 2 units |
|---|---|---|---|
| $x_{H2i}$ | Volume (molar) concentration of hydrogen in the feed at measurement time $t_i$ | ppmv | Moles $H_2$/mole feed |
| $x_{COi}$ | Volume (molar) concentration of CO in the feed at measurement time $t_i$ | ppmv | Moles CO/mole feed |
| $t_i$ | Time when the $i^{th}$ measurement is taken | seconds | seconds |
| $t_{bt(n)}$ | Time at first breakthrough (of either $H_2$ or $O_2$) in cycle n | seconds | seconds |
| $F_{ri}$ | Flow of feed bypassing catalytic unit at time $t_i$ | Scfh | Moles/sec |
| $C_c$ | $O_2$ capacity of one metal getter at operating temperature and pressure | | Moles $O_2$ |
| $T_{theo(n)}$ | Theoretical breakthrough time for cycle n | | seconds |

The oxygen flow adjustment in the above examples can be made at the start of the cycle), which begins just after the stream rerouting or switching between the metal getter beds. If there are sample points for monitoring hydrogen and oxygen in intermediate parts of the beds, flow adjustments can be made to adjust the oxygen inventory via the control valve 327 during a cycle.

In embodiments using more than one getter bed (and there could be more than two if desired, the second getter bed in the above embodiment presents an additional control variable to the one getter bed embodiments. The split of flow, $F_r$ to $F_{total} - F_r$ can be adjusted via control valve 306 to meet additional operating constraints such as minimum oxygen concentrations to the catalytic unit 222, maximum oxygen concentrations to the metal getter beds 210a and 210b and maximum temperature constraints for effective catalyst and getter operation. Control over how the flow of the contaminated argon feed is portioned between $F_r$ and $(F_{total} - F_r)$ can also allow the system to handle a larger concentration of getter combustibles in the feed. If needed additional metal getter beds, and flow controls and/or feed storage tanks can be provided to handle an uneven flow of contaminated argon feed to the process of the invention.

The sequential oxidation and reduction of the respective metal getter beds in a multibed system allows for the essentially continuous purification of a noble gas stream without taking a metal getter bed off line.

The individual components of the process of this invention are all commercially available or may be constructed by a person of ordinary skill in the art.

This invention has been described with reference to particular embodiments. Additional embodiments would be apparent to persons of ordinary skill in the art and are within the scope of the claims.

What is claimed is:

1. A process for the purification of a noble gas containing gas comprising the steps of:
   (a) passing a first noble gas stream comprising an unacceptable amount of at least one getter combustible through a first metal getter bed comprising a metal getter oxide under conditions for converting the getter combustible to combustion products thereby generating a first effluent stream which is essentially free of said at least one getter combustible and wherein said metal getter is converted to a reduced state;
   (b) passing a second noble gas stream through a catalytic unit and effecting catalytic combustion of said at least one getter combustible thereby forming an oxidizing stream, said oxidizing stream is essentially free of getter combustible and comprises unreacted oxygen;
   (c) passing the oxidizing stream formed in step (b) through a second metal getter bed containing a metal getter in reduced state and under conditions for forming a metal getter oxide thereby generating a second effluent stream which is essentially free of oxygen and essentially free of getter combustible; and,
   (d) switching the flow of said first noble gas stream and said oxidizing stream whereby the oxidizing stream generated in step (b) flows to the first metal getter bed and said first noble gas stream flows to the second metal getter bed.

2. The process of claim 1 further comprising the steps of:
   (e) switching the flow of said first noble gas stream and said oxidizing stream whereby the oxidizing stream generated in step (b) flows to the second metal getter bed and said first noble gas stream flows to the first metal getter bed;
   (f) collecting the effluent streams from said first and second getter beds;
   (g) repeating steps (d) through (f).

3. The process of claim 1 wherein the noble gas streams comprise argon.

4. The process of claim 1 wherein the metal getter beds comprise copper.

5. The process of claim 1, further comprising the step of introducing oxygen at a flow rate into the second noble gas stream prior to or during step (b).

6. The process of claim 5 further comprising the steps of: calculating a molar flow rate of oxygen ($F_{O2}$) for introducing via said introducing step using Equation 1:

$$F_{O2}=(F_{total}-F_r)(\tfrac{1}{2}X_{H2}+\tfrac{1}{2}X_{CO}+nX_{THC})+F_r(\tfrac{1}{2}X_{H2}+\tfrac{1}{2}X_{CO}+n'X_{OGC})-F_{total}*X_{O2} \quad \text{Equation 1:}$$

wherein $F_{O2}$ refers to the molar flow rate of $O_2$, $F_{total}$ refers to the total noble gas feed rate to the process calculated by adding the first and second noble gas streams, $F_r$ refers to said first noble gas stream flow rate, $F_{total}-F_r$ refers to the second noble gas stream flow rate, $X_{H2}$ refers to the molar concentration of $H_2$ in the streams ($F_{total}-F_r$) and $F_r$ respectively, $X_{CO}$ refers to the molar concentration of CO the streams $F_{total}-F_r$ and $F_r$, $X_{THC}$ refers to the molar concentration of hydrocarbons in stream ($F_{total}-F_r$) and n and n' are multipliers to provide a balanced equation, $X_{OGC}$ refers to the molar concentration of getter combustibles other than $H_2$ and CO;

and then during said introducing step injecting plus or minus 15% of said $F_{O2}$ into said second noble gas stream.

7. The process of claim 5 further comprising prior to said switching step (d), the step of:
analyzing at least one of said effluent streams from said first or second metal getter bed for actual breakthrough of said getter combustible or said oxygen.

8. The process of claim 7 further comprising the step of controlling the oxygen flow rate in said introducing step based on the actual breakthrough time of at least one of the metal getter beds.

9. The process of claim 5 further comprising the step of controlling the oxygen flow rate to the system in said introducing step based on the ratio of actual to theoretical breakthrough times.

10. The process of claim 1 wherein said switching step (d) is effected prior to actual breakthrough of getter combustible or oxygen in at least one of the first or second effluent streams from said first metal getter bed or said second metal getter bed.

11. The process of claim 1 wherein said switching in step (d) is effected immediately subsequently to breakthrough of getter combustible or oxygen in at least one of the first or second effluent streams from said first metal getter bed or said second metal getter bed.

12. The process of claim 1 further comprising the step of:
analyzing at least one of said gas streams within at least one of said first or second metal getter bed for imminent breakthrough of said getter combustible or said oxygen prior to said switching step, and effecting said switching step prior to said breakthrough of getter combustible or oxygen in at least one of said first or second effluent streams from said first or said second metal getter bed.

13. A process for the purification of a noble gas stream contaminated with unacceptable amounts of hydrogen and optional combustible contaminants which uses a single bed, comprising:
(a) introducing an oxygen containing stream to a metal getter bed containing a metal getter in reduced state to form a metal getter oxide;
(b) introducing the noble gas stream to the metal getter bed employed in step (a) which forms a metal getter oxide and converts the hydrogen in said noble gas stream to water thereby generating an effluent stream essentially free of hydrogen and oxygen;
(c) terminating the step of introducing the oxygen containing steam to the metal getter bed after forming said metal getter oxide in step (a) in order to maintain the generating of the effluent stream essentially free of hydrogen and oxygen in step (b);
(d) continuing the introducing of said noble gas stream to said metal getter bed in step (b) for reducing the metal getter oxide; and,
(e) repeating said steps (a) through (d) for effecting continuous recovery and purification of said noble gas stream.

14. The process of claim 13 wherein the noble gas stream comprises argon.

15. The process of claim 14 wherein said metal getter bed comprises copper.

16. A process for the purification of a noble gas stream having unacceptable amounts of at least one getter combustible which comprises:
(a) effecting catalytic combustion of said getter combustible in a catalytic unit thereby forming an oxidizing stream essentially free of getter combustible and comprising unreacted oxygen;
(b) passing the oxidizing stream formed in step (a) through a metal getter bed containing a metal getter in reduced state and under conditions for forming a metal getter oxide and generating an effluent stream which is essentially free of said oxygen and said getter combustible;
(c) terminating catalytic combustion in said catalytic unit prior to substantial breakthrough of oxygen in said effluent stream from said metal getter bed in order to generate an effluent stream from said metal getter bed which is essentially free of getter combustible and oxygen;
(d) introducing a noble gas stream containing unacceptable amounts of getter combustible to said metal getter bed; and,
(e) recovering a noble gas product from said metal getter bed which has been generated by the process set forth in steps (a) through (d).

17. The process of claim 16 wherein the metal getter comprises copper.

18. The process of claim 17 wherein the catalyst in the catalytic unit comprises Pd or Pt.

19. The process of claim 18 wherein the at least one getter combustible is hydrogen 20. The process of claim 19 further comprising the steps of (f) continuing step (d) until prior to substantial breakthrough of said getter combustible in said noble gas product stream from said metal getter bed; (g) recovering a noble gas product from said metal getter bed; and (h) repeating steps (a) through (g) for effecting continuous purification and recovery of said noble gas stream.

* * * * *